United States Patent [19]

Dickerson

[11] Patent Number: 5,385,391
[45] Date of Patent: Jan. 31, 1995

[54] LARGE TRUCK WITH COMPLIANT FRAME MEMBERS

[75] Inventor: Alan W. Dickerson, Mt. Eliza, Australia

[73] Assignee: Broken Hill Proprietary Company Limited, of BHP House, Victoria, Australia

[21] Appl. No.: 119,530

[22] Filed: Sep. 13, 1993

Related U.S. Application Data

[63] Continuation of Ser. No. 752,513, filed as PCT/AU90/00084, Mar. 2, 1990, abandoned.

[30] Foreign Application Priority Data

Mar. 3, 1989 [AU] Australia .................... PJ 3029
Sep. 8, 1989 [AU] Australia .................... PJ 6255
Dec. 21, 1989 [AU] Australia .................... PJ 7941

[51] Int. Cl.$^6$ .................................... B60P 1/16
[52] U.S. Cl. ............................ 298/17 R; 298/17 S; 280/700; 280/798
[58] Field of Search ............... 298/17 S, 22 R; 301/125; 280/700, 717, 721, 781, 798

[56] References Cited

U.S. PATENT DOCUMENTS

| | | | |
|---|---|---|---|
| 2,055,767 | 9/1936 | Jarmin | 280/798 |
| 2,221,196 | 11/1940 | Klavik | 280/700 |
| 2,459,372 | 1/1949 | Fraunfelder | 298/17 S |
| 3,704,040 | 11/1972 | Davis et al. | 298/22 R |

FOREIGN PATENT DOCUMENTS

| | | | |
|---|---|---|---|
| 0210145 | 9/1987 | Japan | 298/22 R |
| 1283143 | 1/1987 | U.S.S.R. | 298/22 R |
| 1521632 | 11/1989 | U.S.S.R. | 298/17 S |

Primary Examiner—Michael S. Huppert
Assistant Examiner—Gregory A. Morse
Attorney, Agent, or Firm—Nikaido, Marmelstein, Murray & Oram

[57] ABSTRACT

A large truck with compliant longitudinal frame members is disclosed. The truck has a pair of rear wheel hubs which are independently mounted on the frame members so that the hubs and their tires will rotate about the longitudinal axis of the frame members to accommodate uneven terrain and minimize the forces applied to the individual tires. This also minimizes bending loads on the main frame, rear axles and rear wheel support systems.

30 Claims, 7 Drawing Sheets

FIG.10

LARGE TRUCK WITH COMPLIANT FRAME MEMBERS

This application is a continuation of application Ser. No. 07/752,513 filed as PCT/AU90/00084, Mar. 2, 1990, now abandoned.

FIELD OF THE INVENTION

This invention relates to frames for very large trucks of the type used in mining operations.

BACKGROUND OF THE INVENTION

The payload capability of a mining truck is the size parameter which counts in final use of such trucks. However, in the design process it is the gross vehicle mass that is controlled by the availability of major components and systems used in these trucks. The tires, engine, transmission system, retardation system, braking system, suspension system and many other components must match the gross vehicle mass rating of the truck. There are very definite limits to the load rating of tires, power rating of engines, etc. and in considering possible future mining truck developments it is necessary to start with the possible future developments of engines, tires, transmission systems and other smaller components. After the possible gross vehicle mass ratings have been established, the likely tare mass values can be established, and subtraction of the tare mass from the gross vehicle mass rating provides the rated payload capacity for a possible design.

There is much commonality between currently available trucks made by different manufacturers and the following observations are generally applicable regardless of the truck manufacturer:

The travel of the rear suspension system of a fully loaded truck is very limited compared to the scale of the truck. Typically the maximum travel in the compression direction of the rear axle relative to the main frame is only of the order of 50 mm when loaded.

Most of the compliance in the rear of the truck is provided by the tires.

The main frames of these trucks are complex welded steel structures that are heavy (e.g. 16.5 tonnes for the main frame of a truck with a payload rating of 172 tonnes), expensive to design, develop and manufacture, and prone to fatigue cracking.

The main load carrying member (the body) of the trucks is a very strong and generally stiff member. This strength and stiffness is a consequence of the need for the body to withstand the shock loads applied during loading of large rocks by large excavators.

The body is generally supported from the main frame of the truck at numerous points. For example at the rear pivot points, at two, four, six or eight points along the underside of the body and in some trucks also at forward extensions of the body which contact the main frame at points which are close to being above the line of the front wheels. This system of supporting the stiff body causes high variations of stress levels in the supporting main frame of the truck as the truck traverses over uneven ground. This feature causes fatigue problems, high fabricating costs and the need for considerable expenditure to limit the unevenness of the ground on which the trucks travel.

The body is tipped (hoisted) by hydraulic cylinders which react against the main frame of the truck at points near to midway between the front and rear wheels. This causes very large bending loads to be applied to the main frame of the truck and requires that the main frame be very massive at the mid sections.

The total width of the four rear tires is large compared to the total width of the truck. Typically 65% of the total width of a truck is taken up by the four rear tires. With present designs of truck this leads to a very narrow main frame for the truck and very high bending loads on the rear axle and wheel support systems. The narrow main frame causes shortage of space for maintenance of some components, high stress changes during cornering manoeuvres and design restrictions on the body. The net effect is high weight and cost for the main frame, the rear axle, the wheel support assemblies and the body.

The dual rear tires are rotationally locked together. During short radius turning manoeuvres (frequent occurrences in typical mining operations), this causes severe scrubbing type wear of the tires due to the differential travel distance effect. There is also a need for considerable care in matching tire outside diameters and inflation pressures to minimise differential rolling radius effects for straight ahead driving. Relative scrubbing between the two tires of a dual set is considered to contribute significantly to total wear of rear tires on large mining trucks.

In general with currently available truck designs, the transfer of forces between the body and the tires is through a very indirect path which involves high bending loads in the main frame of the truck, the rear axle housing and the rear wheel support systems (the final drives or the wheel motor housings). Furthermore these bending loads fluctuate greatly as the truck travels over uneven ground.

Figures 1, 3:
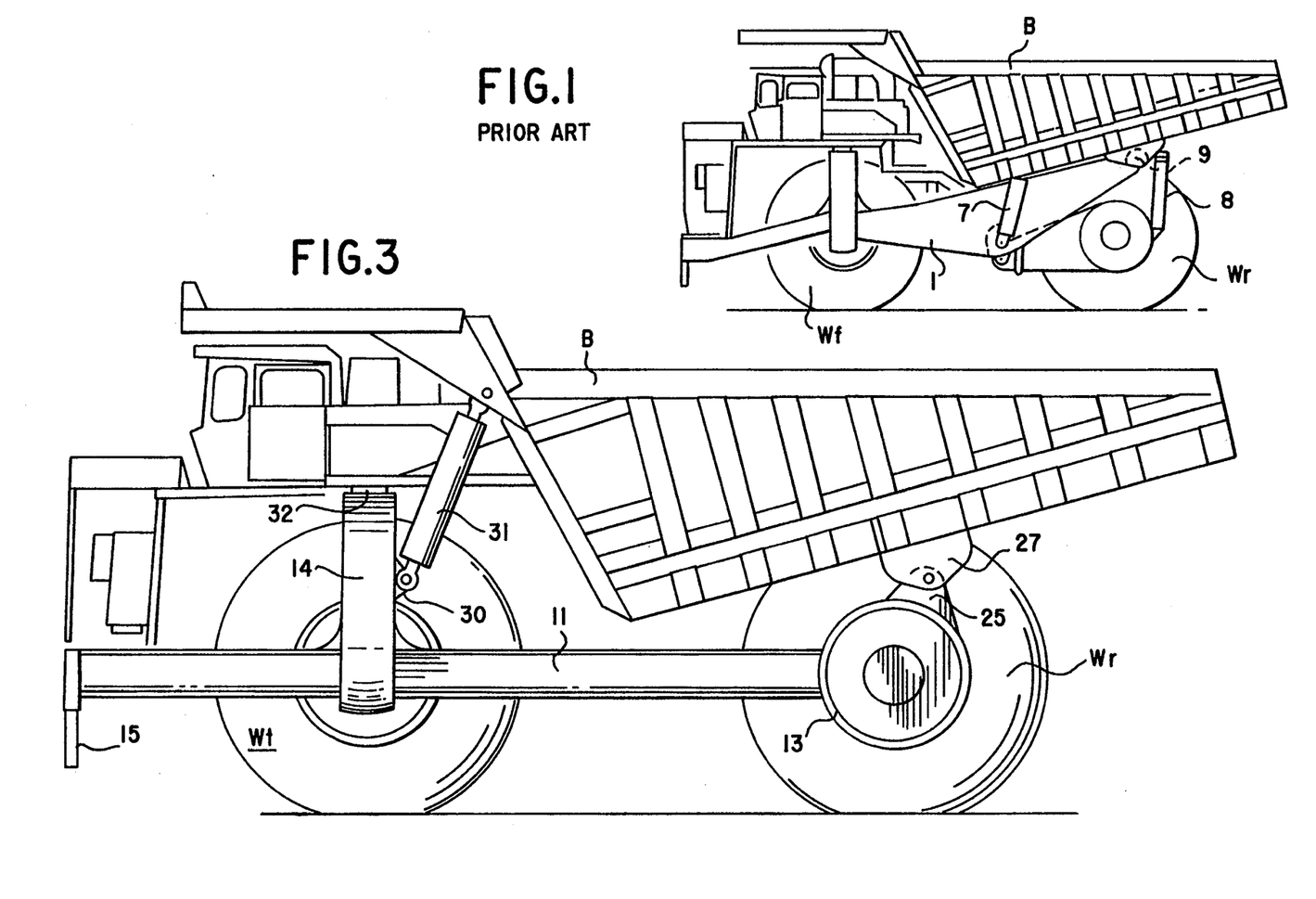
FIG. 1 is a side elevation of a typical large mining truck, in the present case. a Dresser/Wabco 190.
FIG. 3 is a side elevation of a truck incorporating the frame of FIG. 2, with the near side wheels removed for clarity.

A typical very large mining truck is shown in FIG. 1 of the drawings and it will be noted that the frame structure is quite substantial and this results from the frame being required to bear the load supported by the body of the truck by contact between the body and the upper surfaces of the frame, and by virtue of the body hoisting rams being connected to the frames as shown.

While many truck frame design improvements have been suggested over the years, no one design has addressed more than a few of the difficulties which have been outlined above. For example, U.S. Pat. No. 3,704,040 Davis et al discloses a frame arrangement in which the rear wheel pairs are centrally supported, the independent suspension arrangement which is described as addressing many of the problems created by uneven terrain is extremely complex and consequently expensive, and most of the load supported by the body is transferred indirectly through the frame, resulting in a frame of substantially proportions and mass.

SUMMARY OF INVENTION AND OBJECTS

It is an object of the present invention to provide an improved very large vehicle frame in which a substantial number of the problems outlined above are at least ameliorated.

The present invention provides a truck comprising a main frame having a front section and a rear section, said front section carrying forward frame means for supporting at least two front wheels, said rear section including spaced frame members each having a wheel mounting hub attached thereto, each hub supporting a pair of rear wheels one on either side of said hub, a substantially rigid load supporting body, means for pivotally mounting said body with respect to said frame, means for maintaining transverse spacing between said rear wheel pairs, said spaced frame members being constructed to provide resistance to torsional movement of said rear wheels due to braking and traction forces while at the same time providing compliance for limited rotation of said rear wheel pairs about a longitudinal axis of each frame member to allow side tilting of said rear wheel pairs as said truck passes over uneven terrain.

The body is preferably pivotally mounted at least adjacent said hubs substantially centrally of each rear wheel pair such that pivotal movement of said body is about an axis which lies within the profile of the rear wheel pairs. In one embodiment, the body is directly pivoted to the hubs, while in another embodiment the body is directly pivoted to part of the frame and the frame is pivotally connected to the hubs.

In a particularly preferred form, the frame comprises a crossed shaft means directly attached to each of said frame members such that one of said crossed shafts extends longitudinally of said frame members, bearing means secured to each hub and engaging said one of said crossed shafts to facilitate limited pivotal movement of said hubs about the axis of said one of said crossed shafts, the other of said crossed shafts providing said pivotal mounting for said body.

In another form, the invention provides a truck comprising a main frame having a front section and a rear section, said front section carrying forward frame means supporting a pair of front wheels, said rear section including spaced frame members each carrying means for supporting a wheel mounting hub carrying a pair of driven rear wheels, with one wheel on either side of said hub, means for pivotally mounting said body at or adjacent said hub supporting means whereby said pivot mountings are in substantially overlying relationship with each pair of rear wheels, said body being sufficiently rigid to substantially maintain the spacing between said spaced frame members, means on said forward frame means for supporting a front portion of said body at at least one position at or adjacent a vertical plane passing through the axis of rotation of said truck wheels, means for elevating said front portion of said body about said pivot mountings and being supported by said forward frame means to reduce the application of bending movements to said frame, said body being supported only by said pivot mountings and by said supporting means for said front portion of said body.

It will be appreciated from the above that since the load supporting body of the vehicle is directly supported via the rear wheel hubs and the front frame member, the load supported by the body of the vehicle is far more directly transmitted to the wheels of the vehicle whereby the size of the main frame members may be substantially reduced without compromising the essential functions of the main frame members. The rear section frame members may be substantially tubular. The use of tubular frames provides the additional advantage that they may be used to convey cooling air where electric traction motors are supported by the rear wheel mounting hubs.

In the present specification, the term "tubular" includes split tubular sections in which a small gap is formed longitudinally of the tubular section. The use of a split tubular section may provide the advantage of reducing the torsional stiffness of the main frame members to allow some torsional movement of the main frame members in operation. The slit in the tubular section may be sealed by means of a suitable flexible seal, such as a rubber strip.

The term "tubular" also includes sectional configurations other than circular. For example, the tubular section may be square, hexagonal, octagonal or some other suitable polygonal form.

The use of rear wheel mounting hubs positioned between each pair of wheels suits the use of electric motor systems to drive the rear wheels. The use of such motors has the inherent advantage of enabling the drive problems associated with a solid rear axle to be easily overcome thereby reducing the weight of the rear wheel supporting systems, improving load sharing between the rear tires and reducing the rear tire wear effects of such axles. However, standard mechanical drive systems may be utilised with acceptable results.

In the presently preferred embodiments of the invention, which are described in further detail below, the forward frame member comprises a relatively standard engine collar secured to the spaced main frame members at a position aligned with the required position of the front wheels, which are supported by the collar. The body of the truck is supported centrally, or at transversely spaced positions, on the collar thereby further reducing the torsional forces which are applied to the main frame members during motion of the truck over uneven ground. The collar also carries connection points for hoist rams which are used to tip the truck body for unloading purposes, again reducing bending moments applied to the frame during tipping.

In another aspect, the invention provides a main frame, a forward frame means attached to said main frame for carrying a pair of front wheels, axle means directly connected to said main frame and carrying driven rear wheel pairs, and front suspension means attached to said forward frame means and to said front wheels, said front suspension means being constructed to have minimal or zero roll resistance.

BRIEF DESCRIPTION OF THE DRAWINGS

Several presently preferred embodiments of the invention will now be described with reference to the accompanying drawings in which.

Referring firstly to FIG. 1 of the drawings, the massive size of a typical very large mining truck frame will be evident. The size of the main frame members 1 is principally caused by the need for the frame to resist torsional forces created by travel of the truck over uneven ground and the load forces transferred from the body 3 through the frame members 1 to the front and rear wheels $W_f$ and $W_r$. The torsional forces applied to the frame members 1 are aggravated by the use of a solid rear axle extending between the rear wheel pairs $W_r$. Substantial stresses are also generated in the main frame members 1 during unloading since the entire load of the body and the material supported thereby is carried by the frame members 1, and that load is concentrated in the rear portion of the frame members 1 due to the mounting of the body hoist rams 7 centrally of the frame members 1 and the rear pivots 9 for the body B at the rear of the frame members 1.

Figures 2, 4:
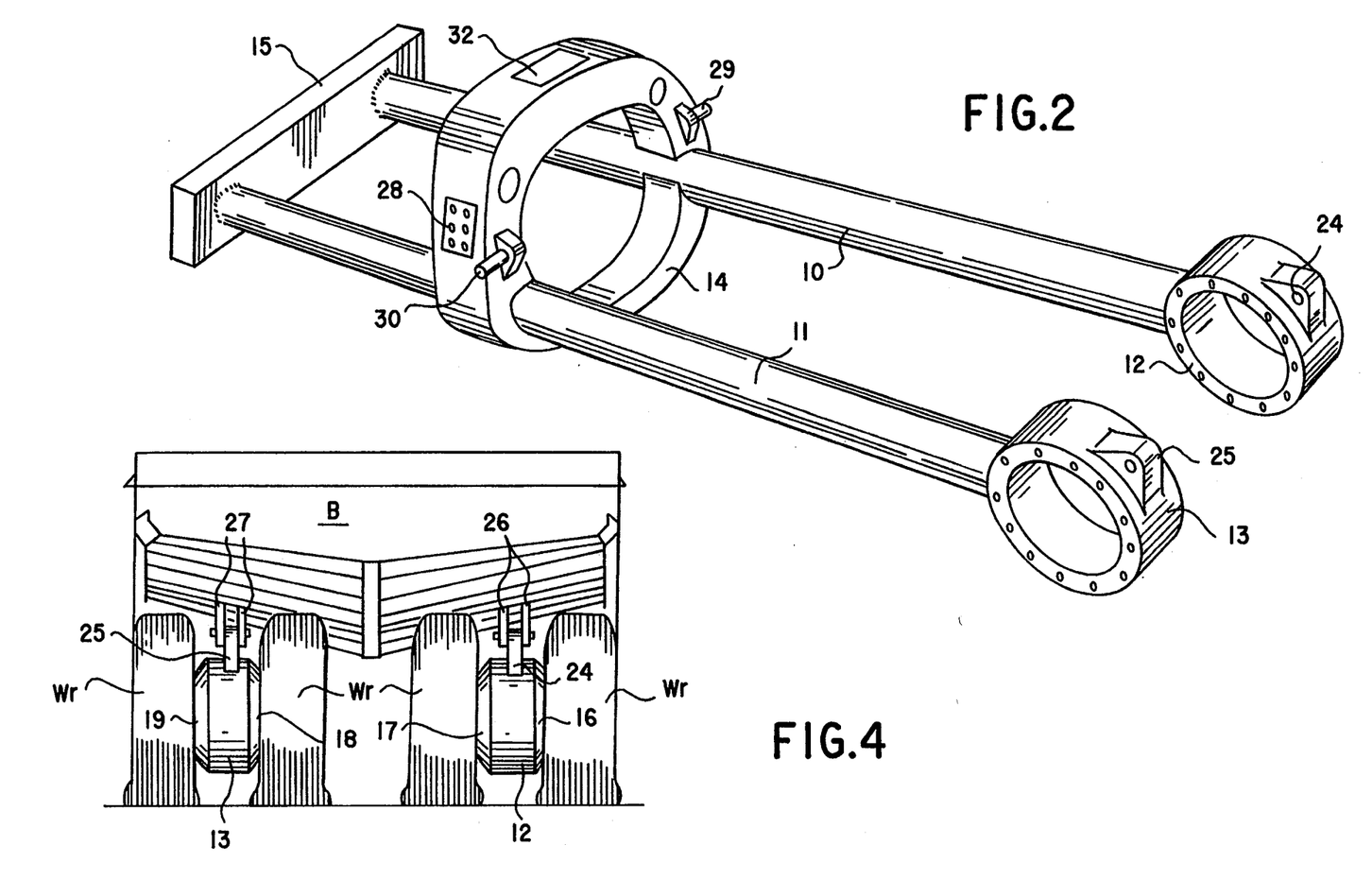
FIG. 2 is a schematic perspective view of a frame for a very large truck embodying the invention.
FIG. 4 is a rear elevation of the truck of FIG. 3 showing the rear axle and body attachment details.

Referring now to FIGS. 2 to 4 of the drawings, the truck frame according to a first embodiment of the present invention will be seen to be characterised by a pair of relatively light tubular main frame members 10 and 11 supporting rear wheel mounting hubs 12 and 13 at their rear ends and being connected at their forward ends by a substantial cross member 14, such as an mounting collar, which generally includes mounting points for the suspension (not shown) for the front wheels $W_f$ and a lighter front cross member 15 which may form all or part of the front bumper system.

The wheel mounting hubs 12 and 13 are adapted to support drive means for the rear wheels, such as electric traction motors 16, 17, 18 and 19 which are in turn connected to rear wheels $W_r$, with each wheel being mounted one on either side of the hubs 12 and 13, as most clearly shown in FIG. 4 of the drawings.

The rear wheel mounting hubs 12 and 13 also carry pivot mounts 24 and 25 to which the truck body B is pivotally mounted via pivot connection plates 26 and 27. The pivoting connection is usually of the spherical ball type to provide the required freedom of alignment during transverse rotation of wheel hubs.

The collar 14 is provided with front wheel mounting plates 28 of relatively standard construction, by means of which a known suspension (not shown), such as a Wabco/Dresser Hydrair II, is attached, pivot mounts 29 and 30 for body hoist rams 31, which are suitably attached to the body as shown in FIG. 3 of the drawings, and a central hard rubber body supporting pad 32 through which the forward end of the truck body is supported as shown in FIG. 3 of the drawings.

Details of the attachment of the traction motors 16 to 19, the front wheel assemblies, the engine and the construction of the truck ancilliaries including the driver's cab has not been included in this specification since each of these items can be of relatively standard construction and is within the existing knowledge of a person of skill in the art. It will, however, be noted that the rear axles are independent short axles with one tire on either side and that the truck body B is pivoted directly on the axle housings within the profile of the rear wheels and substantially centrally above each wheel pair.

It will also be appreciated from the above that while there is no substantial cross member between the main frame members 10 and 11 between the rear wheel mounting hubs 12 and 13 and the substantially conventional mounting collar 14 in this embodiment, the main frame members 10 and 11 maintain the lengthwise spacing between the front and rear wheels at all times (including during load tipping operations), and the bending strength required to resist significant rotation of the wheel mounting hubs 12 and 13 in the longitudinal plane. Such rotational loads on the hubs 12 and 13 will arise from the vertical offset (in the longitudinal plane) between the body pivot mounts 24 and 25 and the tire to ground contact points, rear wheel tractive effort forces and rear wheel braking forces. The transverse spacing of the frame members 10 and 11 is also maintained to a significant extent by the direct attachment of the body B to the hubs 12 and 13 at the pivot mounts 24 and 25. This use of the inherent strength of the body B enables a further reduction in the frame strength, weight and cost.

The main frame members 10 and 11 are designed to have low torsional stiffness so that the wheel pairs are relatively free to rotate in the transverse plane. This latter characteristic enables good sharing of tyre to ground contact loads between the two tyres in a rear pair even when the truck is traversing uneven ground. A limit to the rotation of the rear wheel pair in the transverse plane is provided by means other than the torsional stiffness of the main frame members 10 and 11, such as tyre contact with the body, or limiting the rotation of the spherical pivots in the body pivot mounts 24 and 25. Similarly, to reduce the loads applied to the frame by such twisting movements, the front suspension should have limited or zero roll resistance. This may be achieved by interconnecting the gas chambers of the suspension units referred to above, or in any other suitable manner.

The use of tubular sections for the main frame members 10 and 11 has a number of advantages, including the avoidance of stress concentrations at the corners of frame elements, as well as the ability to use the frame members to conduct cooling air to the traction motors supported by the hubs 12 and 13, although it will be appreciated from the construction of the later embodiments that the use of such tubular sections is not essential.

The frame arrangement described above significantly reduces the weight of the frame of the truck to provide a low tare mass truck. The described frame will function adequately without an intervening suspension system for the rear wheels, although a suitable suspension system may be used if special local requirements require it. The supporting of the truck body on the rear wheel mounting hubs 12 and 13 and on the engine/front wheel mounting collar 14 means that the body is supported only at points which are close to above the centre line of the front and rear wheels of the truck. This significantly reduces the load forces which are applied to the main frame members 10 and 11 thereby enabling significantly lighter frame members to be used. For similar reasons, the reaction points for the tipping rams and pivot means for the body of the truck are also located on the collar 14 and the mounting hubs 12 and 13.

The frame described above is also designed to allow significant compliance between the two rear wheel pairs of the truck, thereby avoiding the need for a rigid connection between the wheel pairs and allowing at least limited independent movement of each wheel pair as the truck passes over uneven terrain. The location of the rear wheel mounting hubs 11 and 13 between each pair of wheels allows independent rotation of each wheel thereby avoiding tire wear caused by short radius turning and differences in tire rolling radii.

Figure 5:
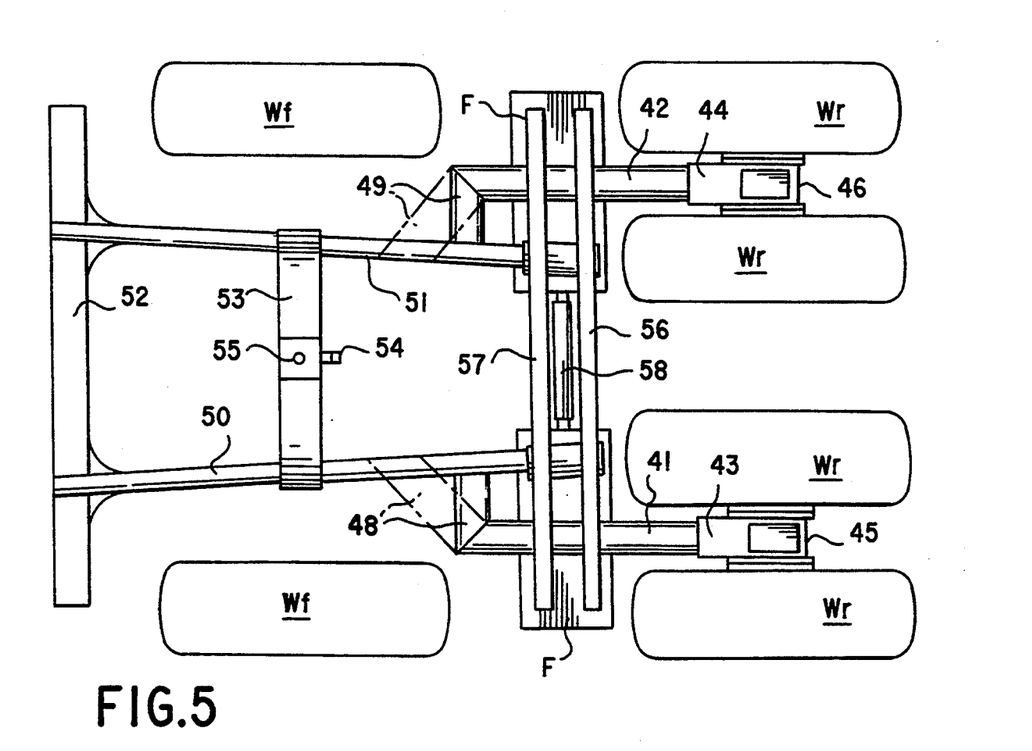
FIG. 5 is a schematic plan view of a truck frame according to another embodiment of the invention, showing the front suspension details removed for clarity.
Figure 6:
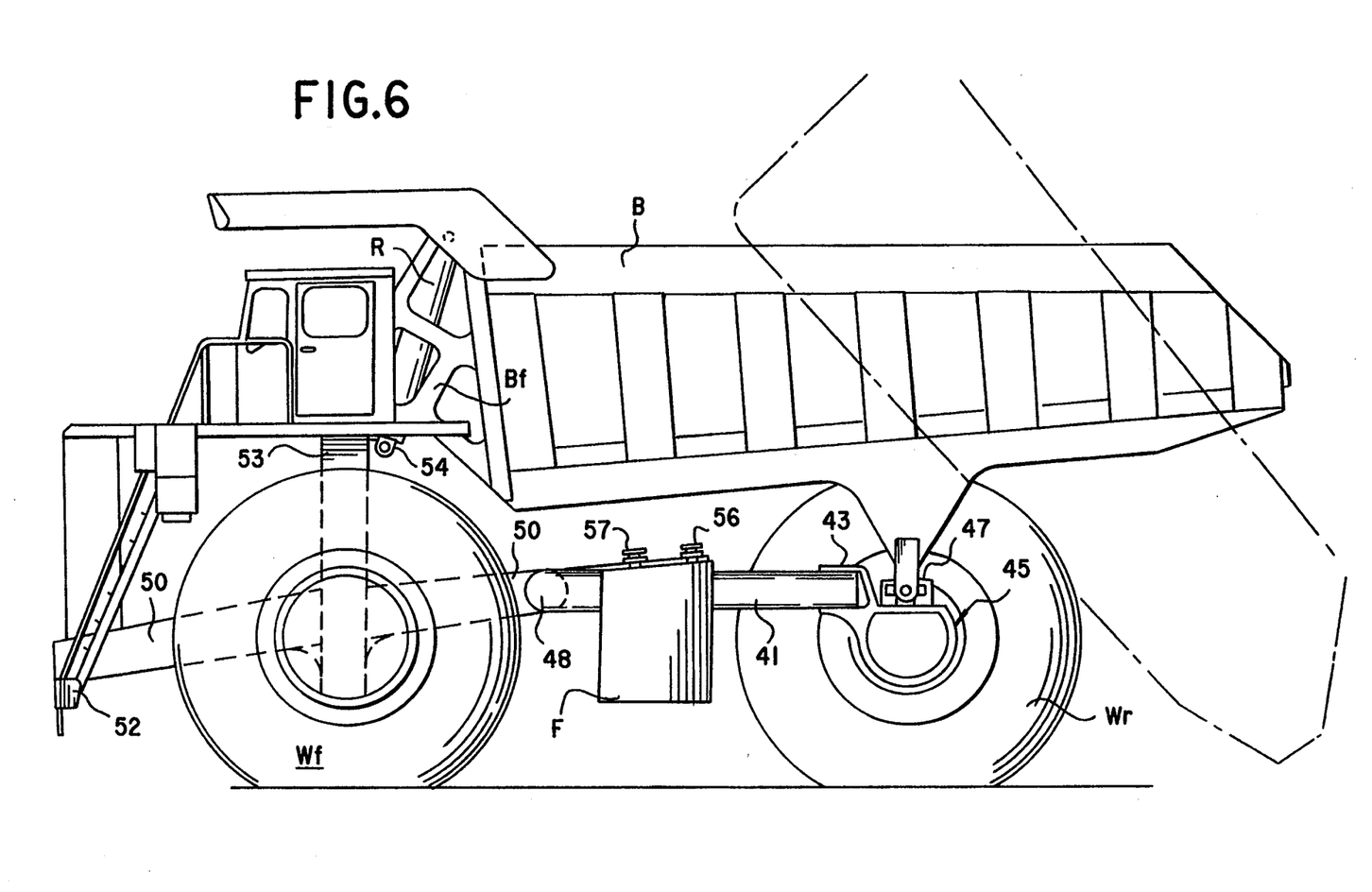
FIG. 6 is a side elevation of a truck having the frame of FIG. 5, with the near side rear wheels removed for clarity.

Referring now to FIGS. 5 and 6, a second embodiment of the invention comprises a pair of rear frame portions 41 and 42 of generally tubular cross-section received in sockets 43 and 44 formed in rear wheel mounting hubs 45 and 46 supporting a truck body tipping pivot 47, as shown in FIG. 6 of the drawings. Each tubular frame portion has a forward connecting portion 48 and 49 extending laterally inwardly from its forward end and is connected to one of a pair of rectangular box-section forward frame portions 50 and 51 which extend from a position between said rear frame portions 41 and 42 to the front of the frame structure where they are connected by a front cross member 52 of any suitable construction. A forward frame means or mounting collar 53 is secured to the forward frame portions 50 and 51 and has a mounting point 54 for a central tipping ram R (FIG. 6) as well as a truck body engaging pad 55 positioned as shown in FIG. 5 of the drawings. The mounting collar 53 supports front wheels $W_f$ in a known manner not shown in the drawings, by means of a low or zero roll resistance front suspension of the type outlined above, and the spacing between the forward frame portions 10 and 11 is such as to allow the front wheels to be turned for steering purposes.

The frame portions 50 and 51 are braced by cross frame members 56,57, which also provide support for fuel and hydraulic oil tanks F. The frame members 56 and 57 are designed to have stiffness in the horizontal plane, to maintain the spacing between the frame portions 50 and 51, but to have less stiffness in a vertical plane, to allow the twisting of the rear frame portions 50 and 51 referred to above. The fuel and oil tanks F are further supported by a central frame 58 in the manner shown in FIG. 5 of the drawings.

As shown most clearly in FIG. 6 of the drawings, the body B of the truck is pivotally mounted on the hubs 45 and 46 at 47, and may be tipped, as shown in broken outline, by actuation of the tipping ram R. The forward portion $B_f$ of the body B engages the support pad 55 in operation so that the truck body B has only three support points and only one central tipping ram mounting point 54.

As shown in FIG. 5, the pad 55 has a central pin which operates to ensure positive location of the body portion $B_f$ with respect to the frame by engaging an aperture (not shown) in $B_f$.

If desired, the connecting portions 48 and 49 may extend forwardly to the forward frame portions 50 and 51, in the manner shown in broken outline in FIG. 5 of the drawings. Similarly, the forward frame portions 50 and 51 may be constructed from generally tubular section frame members, or may be constructed from U-shaped channel frame members, in which event the attachment of the connecting portions 48 and 49 may be completed by the securement of plates (not shown) across the open inner faces of the channel sections. The connecting portions 48 and 49 are connected to the forward frame portions 50 and 51 by welding or by other suitable attachment means.

As described above, the tubular frame members 41 and 42 may be slit without negating the advantages of the tubular configuration.

Referring to FIGS. 7 to 10 of the drawings, the frame in this embodiment comprises a pair of front frame portions 61 and 62, which may be of box-section as shown, of tubular cross-section, of channel cross-section, or any other suitable cross-section, connected in spaced apart relationship by a forward frame means or mounting collar 63 having truck body engaging pads 64 and 65 (FIGS. 7 and 8) and hoist mounting lugs 66 to which tipping hoists such as H (FIG. 8) are attached. The pads 64 and 64 are positioned at the rear side of the collar 63 to cause a bending moment to be induced in the frame in opposition to the bending moment caused by braking loads.

The frame further includes a pair of spaced parallel rear frame portions 67 and 68 connected to the front frame portions 61 and 62 by connecting frame portions 69 and 70. As shown most clearly in FIGS. 7 and 10, the front frame portions 61 and 62 are more closely spaced than the rear frame portions 67 and 68, and this allows for the front wheels $W_f$ to perform steering movements. Once again, the rear frame portions 67 and 68 and the connecting frame portions 69 and 70 may be of any desired cross-sectional configuration, including those configurations defined above.

Figure 7:
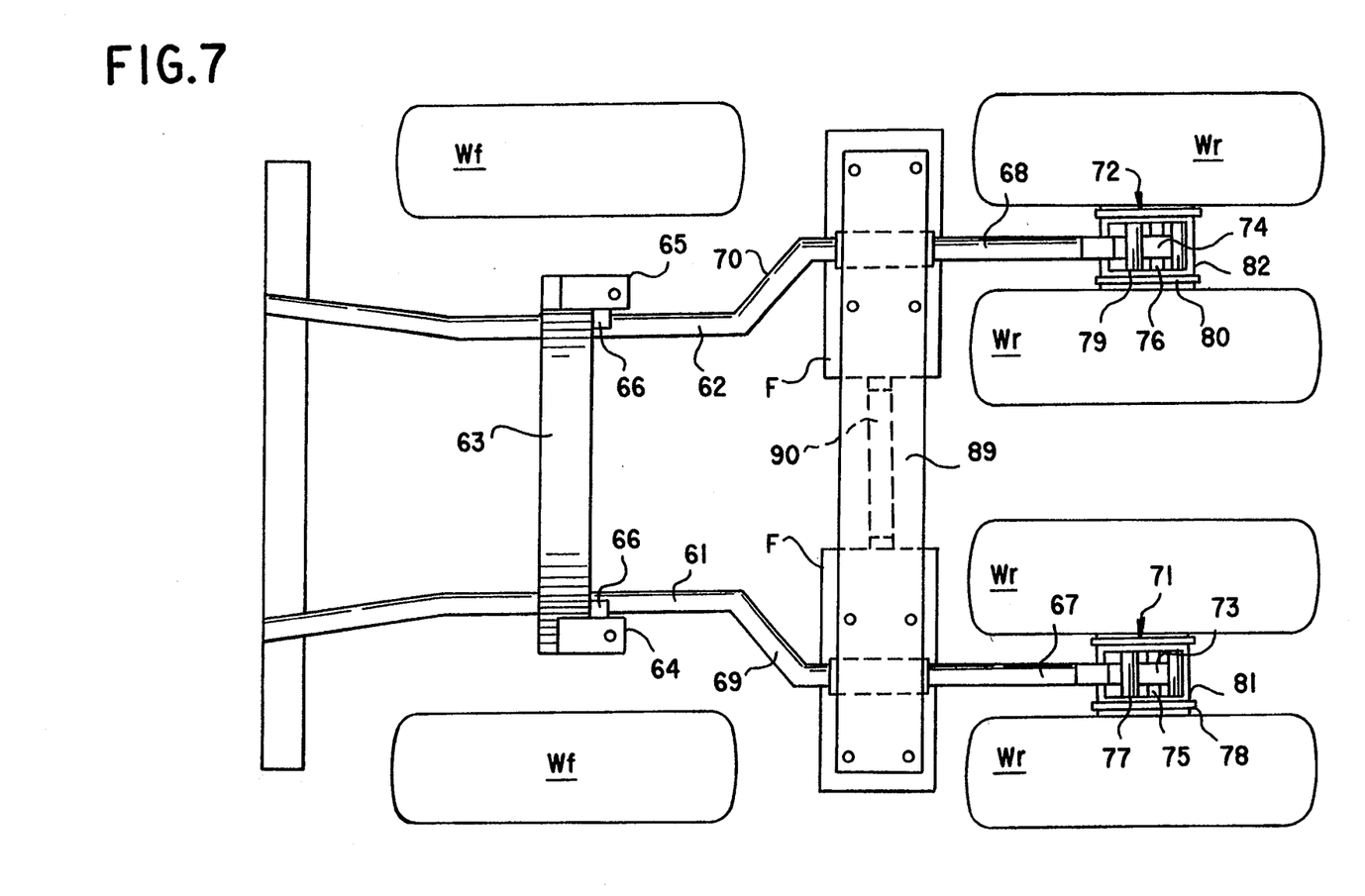
FIG. 7 is a schematic plan view of a further embodiment of a truck frame, with the front suspension details removed for clarity.
Figure 10:
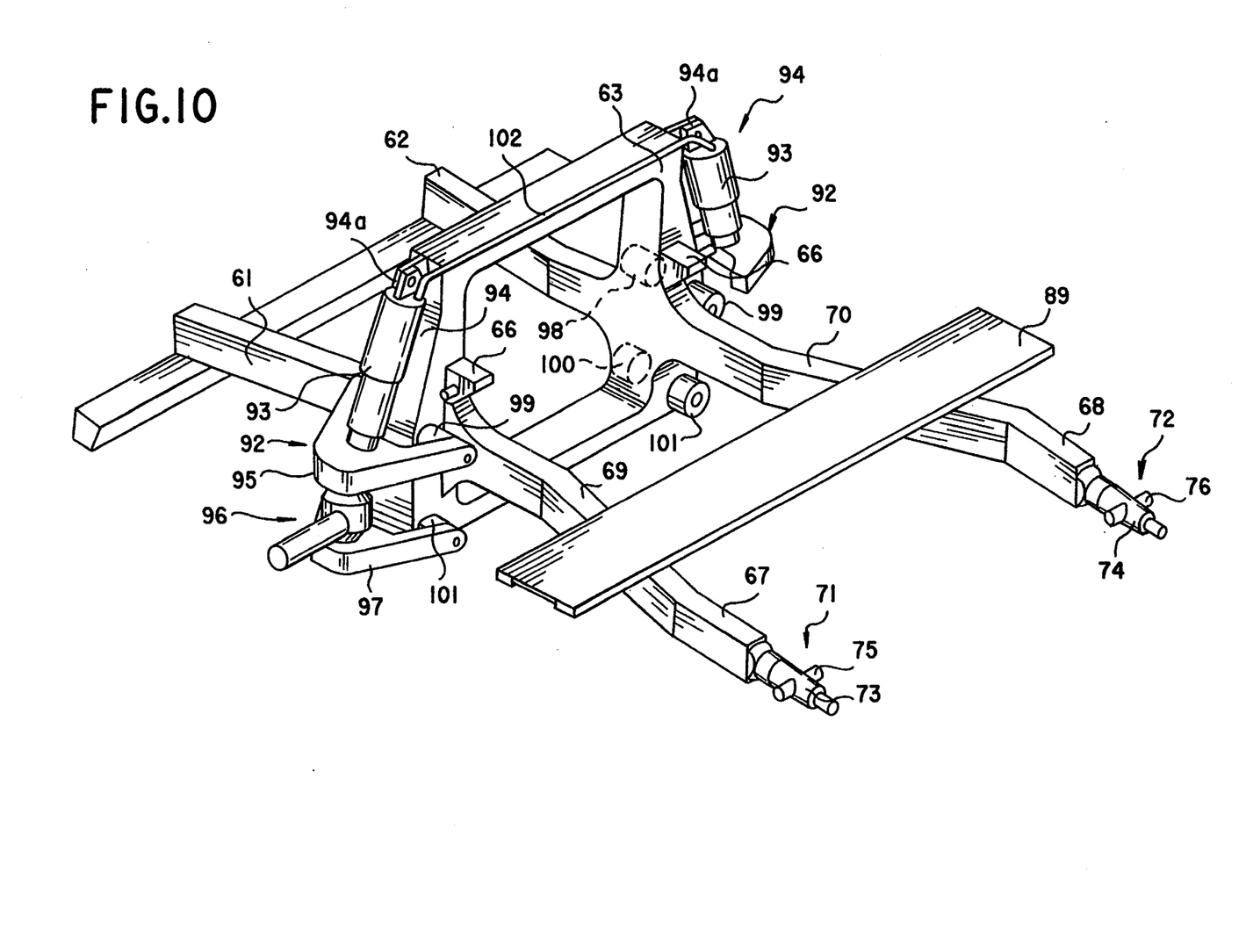
FIG. 10 is a schematic perspective view of a modified version of the frame of FIG. 7 showing a typical front suspension embodying the invention.

At the free end of each rear frame portions 67 and 68, a crossed shaft member 71 and 72 is rigidly attached to the rear frame portion 67 and 68 respectively. The crossed shaft members 71 and 72 respectively comprise a longitudinal shaft 73 and 74 and a transverse shaft 75 and 76, with the longitudinal shafts 73 and 74 being rigidly secured to the free end portion of the rear frame portions 67 and 68, say by suitable welding. The longitudinal shafts 73 and 74 each carry longitudinally spaced bearings 77, 78 and 79, 80, and the bearings 77 to 80 are in turn rigidly connected to hub assemblies 81 and 82 which in turn carry rear wheel pairs $W_r$. Thus, the rear wheel mounting hubs 81 and 82 are able to rotate to a limited extent in a plane transverse to the longitudinal axis of the frame. However, by virtue of the rigid attachment of the longitudinal shafts 73 and 74 of the crossed shaft members 71 and 72 to the rear frame portions 67 and 68, the rear wheel mounting hubs 81 and 82 are restrained from rotation in the longitudinal plane to thereby enable transference of traction and braking forces from the rear wheels $W_r$ to the remainder of the truck.

Figure 8:
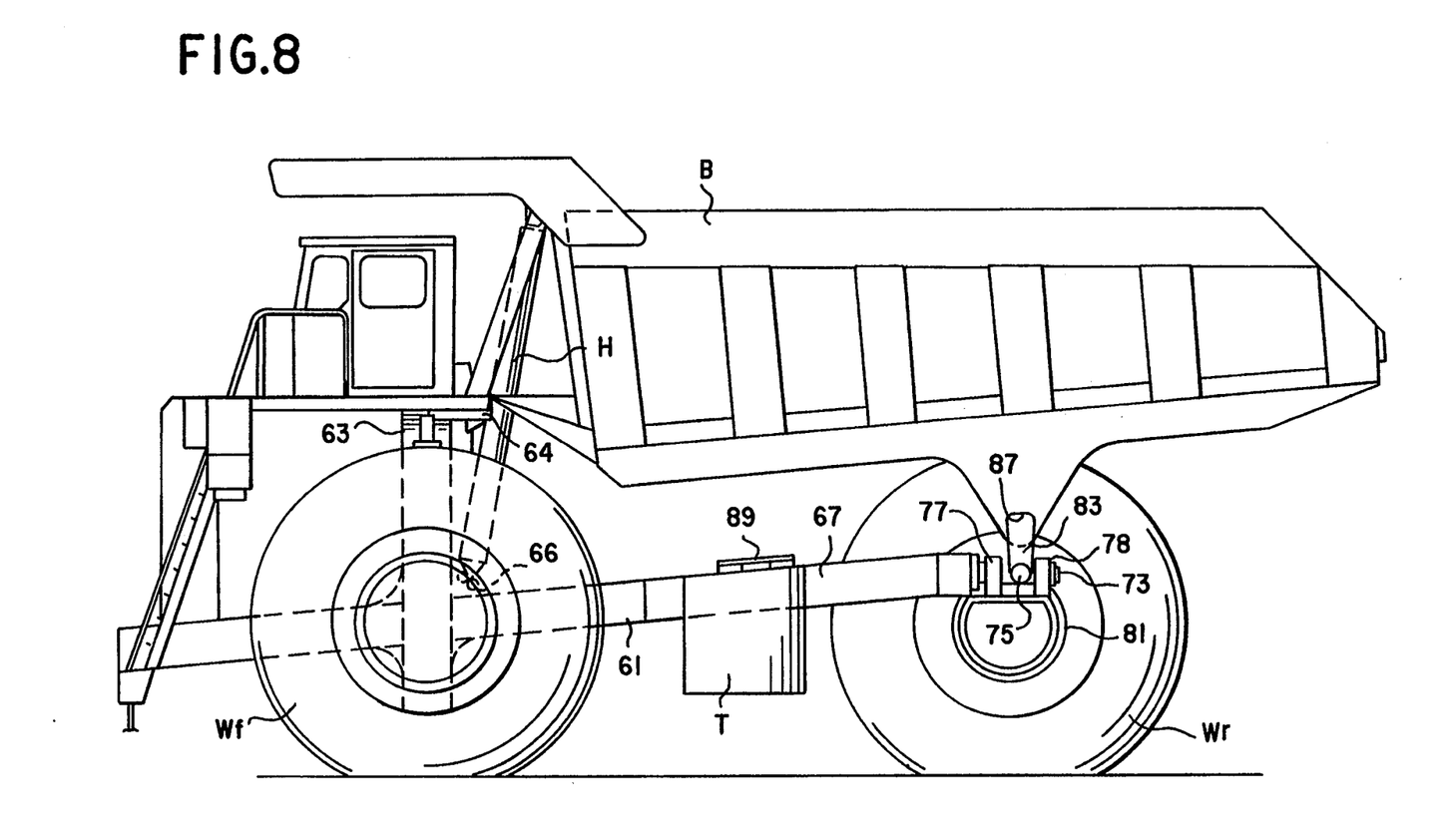
FIG. 8 is a side elevation of a truck having the frame of FIG. 7, with the near side rear wheels removed for clarity.
Figure 9:
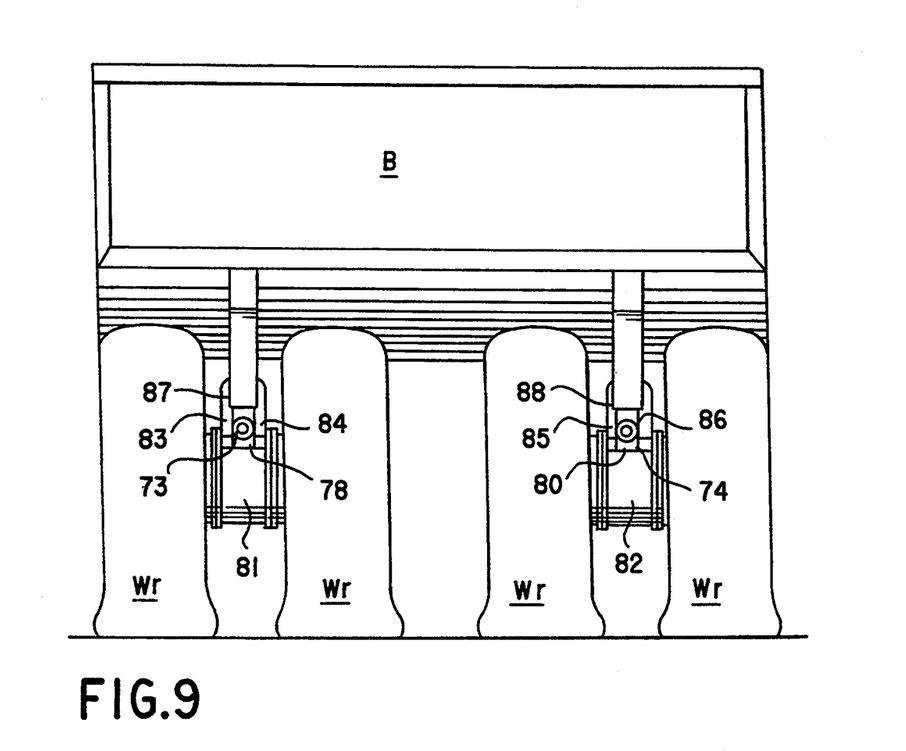
FIG. 9 is rear elevation of the truck of FIG. 8 showing the rear axle and body pivot details.

The load carrying body B of the truck is pivotally attached to the transverse shafts 75 and 76 of the crossed shaft members 71 and 72 by means of bearings 83, 84 and 85, 86 (FIGS. 8 and 9). The bearings 83 to 86 are connected to the load carrying body B by means of bearing holders and connected structures 87 and 88 (FIGS. 8 and 9). Thus, by actuating the tipping rams R at the front of the load carrying body B, the body may be tipped about the common axis of the shafts 75 and 76.

The rear frame portion 67 and 68 are connected by a transverse frame 39 which carries fuel and oil tanks F held in spaced relation by a central spacing frame 90. As in the embodiment of FIGS. 5 to 7, the transverse frame 89 is designed to have horizontal stiffness to maintain the spacing between the frame portions 67 and 68, and vertical flexibility, to allow for twisting of the rear frame portions 67 and 68.

A modified form of the frame shown in FIG. 7 is shown in FIG. 10 of the drawings. In this form of the frame, the rear frame portion 67 and 68 are short and the connecting portions 69 and 70 are longer and less angled than in the previous embodiment. The forward frame or mounting collar 63 carries front suspension assemblies 92 (only one of which is shown in any detail) each comprising a hydropneumatic spring unit 93 (such as Wabco/Dresser Hydrair II), having an upper gas reservoir 94, connected to an upper suspension assembly or wishbone 95 mounted on upper suspension mounting bearings 98,99. The upper suspension assembly 95 in turn carries a front wheel spindle assembly 98, also supported by a lower suspension assembly or wishbone 97, mounted on lower suspension mounting bearings 100,101 also carried by the forward frame or mounting collar 63.

To provide a front suspension with limited or zero roll resistance, the upper gas reservoirs 94 of the spring units 93 are cross connected by means of a conduit 102. Thus, as the truck twists about its longitudinal axis due to uneven terrain, the front suspension assemblies 92 will not provide any significant resistance to that movement, and the loads applied to the body and the frame by such twisting will be limited, thereby reducing weight and manufacturing costs for the body and the frame. It will be appreciated that each of the above described embodiments may include a front suspension having low or zero roll resistance, and that suspension may take any suitable form, such as that shown in FIG. 10. Alternatively, high compliance fully independent front suspensions may be used.

We claim:

1. A truck comprising:
    a main frame having a forward frame and a rear frame, said forward frame including two forward spaced frame members and forward frame means, fixedly positioned transverse between said two forward spaced frame members, for maintaining said forward spaced frame members rigid,
    said rear frame including two rear spaced frame members having front ends which are rigidly affixed to the forward frame means and rear ends which provide compliance for independent relative movement of said rear ends in a plane transverse to a longitudinal axis of each rear spaced frame member;
    a wheel mounting hub attached to each said rear end of said rear spaced frame members, each hub supporting a pair of rear wheels one on either side of said hub;
    rigid load supporting means for supporting a load;
    means for maintaining transverse spacing between said rear wheel pairs; and
    means for pivotally mounting said load supporting means with respect to said main frame;
    wherein independent relative movement of said rear ends of said rear spaced frame members is provided relative to said forward frame in a plane transverse to a longitudinal axis of each rear spaced frame member as said truck passes over uneven terrain.

2. The truck of claim 1, wherein said transverse space maintaining means is at least one of formed integral with said rigid load supporting means and formed as a separate transverse frame means attached to said two rear spaced frame members.

3. The truck of claim 2, wherein said rigid load supporting means is pivotally mounted at least adjacent said hubs substantially centrally of each rear wheel pair such that pivotal movement of said rigid load supporting means is about an axis which lies within a profile of the rear wheel pairs.

4. The truck of claim 2, wherein said transverse frame space maintaining means comprises a cross member interconnecting said two rear spaced frame members, said cross member having substantial stiffness in a horizontal plane to resist relative lengthwise movement between the said two rear spaced frame members, said transverse frame space maintaining means being further for contributing to the maintenance of the transverse spacing between said two rear spaced frame members, but being formed relatively compliant to allow relative up and down displacement between the said two rear spaced frame members.

5. The truck of claim 4, wherein said foward frame means also includes supporting means for supporting a forward end of the rigid load supporting means at a central point or at a pair of transversely spaced points and pivot mounting means for pivotally mounting said rigid load supporting means with respect to said main frame, said supporting means and said pivot mounting means constituting sole supports for said rigid load supporting means on said main frame.

6. The truck of claim 1, wherein said forward frame means is formed as a collar-shaped mounting structure.

7. The truck of claim 1, wherein said forward frame means is formed to support at least two front wheels.

8. A truck comprising:
    a main frame having a forward frame and a rear frame, said forward frame including two forward spaced frame members and forward frame means, fixedly positioned transverse between said two forward spaced frame members, for maintaining said forward spaced frame members rigid,
    said rear frame including two rear spaced frame members having front ends which are rigidly affixed to the forward frame means and rear ends which provide compliance for independent relative movement of said rear ends in a plane transverse to a longitudinal axis of each rear spaced frame member;
    a wheel mounting hub attached to each said rear end of said rear spaced frame members, each hub supporting a pair of rear wheels one on either side of said hub;
    rigid load supporting means for supporting a load and for maintaining transverse spacing between said rear wheel pairs; and
    means for pivotally mounting said load supporting means with respect to said main frame;
    wherein independent relative movement of said rear ends of said rear spaced frame members is provided relative to said forward frame in a plane transverse to a longitudinal axis of each rear spaced frame member as said truck passes over uneven terrain.

9. The truck of claim 8, further comprising:
    a crossed shaft directly attached to each of said two rear spaced frame members such that one of said crossed shafts extends longitudinally of said two rear spaced frame members; and
    bearing means secured to each hub and engaging said one of said crossed shafts, for facilitating limited pivotal movement of said hubs about an axis of said one of said crossed shafts, the other of said crossed shafts providing pivotal mounting for said rigid load supporting means.

10. The truck of claim 8, wherein a front section of said forward frame is formed with said forward spaced frame members interconnected by said forward frame means, said forward frame means having means for supporting an elevating means for a forward end of said rigid load supporting means wherein loads imposed by elevating the rigid load supporting means are transferred substantially directly to front wheels of the truck.

11. The truck of claim 5, wherein said supporting means are located at a rearmost side of said forward frame means to induce a bending moment in said main frame in opposition to bending moments caused by braking.

12. The truck of claim 8, wherein at least said rear spaced frame members are of substantially tubular construction.

13. The truck of claim 12, wherein said forward spaced frame members are of substantially tubular construction.

14. The truck of claim 8, wherein said forward frame means is formed as a collar-shaped mounting structure.

15. The truck of claim 8, wherein said forward frame means is formed to support at least two front wheels.

16. A truck comprising:
a main frame having a forward frame and a rear frame, said forward frame including two forward spaced frame members and forward frame means, fixedly positioned transverse between said two forward spaced frame members, for maintaining said forward spaced frame members rigid,
said rear frame including two rear spaced frame members having front ends which are rigidly affixed to the forward frame means and rear ends which provide compliance for independent relative movement of said rear ends in a plane transverse to a longitudinal axis of each rear spaced frame member;
a hub supporting means for supporting a wheel mounting hub attached to each said rear end of said rear spaced frame members, each wheel mounting hub supporting a pair or rear wheels, one on either side of said wheel mounting hub;
rigid load supporting means for supporting a load and for maintaining transverse spacing between said rear wheel pairs;
pivot mounting means for pivotally mounting said rigid load supporting means at or adjacent said hub supporting means wherein said pivot mounting means is in overlying relationship with each pair of rear wheels, said rigid load supporting means being sufficiently rigid to maintain a spacing between said two rear spaced frame members;
front portion supporting means operatively positioned on said forward frame means for supporting a front portion of said rigid load supporting means at or adjacent a vertical plane passing through an axis of rotation of said front wheels; and
means for elevating the front portion of said rigid load supporting means about said pivot mounting means and being supported by said forward frame means to reduce application of bending moments to said main frame, said rigid load supporting means being supported only by said pivot mounting means and by said front portion supporting means;
wherein independent relative movement of said rear ends of said rear spaced frame members is provided relative to said forward frame in a plane transverse to a longitudinal axis of each rear spaced frame member as said truck passes over uneven terrain.

17. The truck of claim 16, further comprising:
first and second crossed shafts directly attached to each of said rear spaced frame members such that at least said first crossed shaft extends longitudinally of said rear spaced frame members; and
bearing means secured to each hub and engaging said first crossed shaft for facilitating limited pivotal movement of said hubs about an axis of said first crossed shaft, said second crossed shaft being formed integral with said pivot mounting means for said rigid load supporting means.

18. The truck of claim 16, wherein said forward spaced frame member are interconnected by said forward frame means, said forward frame means carrying means for supporting an elevating means for a forward end of said rigid load supporting means wherein loads imposed by elevating the rigid load supporting means are transferred substantially directly to front wheels of the truck.

19. A truck comprising:
a main frame having a forward frame and a rear frame, said forward frame including two forward spaced frame members and forward frame means, fixedly positioned transverse between said two forward spaced frame members, for maintaining said forward spaced frame members rigid,
said rear frame including two rear spaced frame members having front ends which are rigidly affixed to the forward frame means and rear ends which provide compliance for independent relative movement of said rear ends in a plane transverse to a longitudinal axis of each rear spaced frame member;
a hub supporting means for supporting a wheel mounting hub attached to each said rear end of said rear spaced frame members, each wheel mounting hub supporting a pair of rear wheels, one on either side of said wheel mounting hub;
rigid load supporting means for supporting a load;
means for maintaining transverse spacing between said rear wheel pairs;
pivot mounting means for pivotally mounting said rigid load supporting means at or adjacent said hub supporting means wherein said pivot mounting means is in overlying relationship with each pair of rear wheels, said rigid load supporting means being sufficiently rigid to maintain a spacing between said two rear spaced frame members;
front portion supporting means operatively positioned on said forward frame means for supporting a front portion of said rigid load supporting means at or adjacent a vertical plane passing through an axis of rotation of said front wheels; and
means for elevating the front portion of said rigid load supporting means about said pivot mounting means and being supported by said forward frame means to reduce application of bending moments to said main frame, said rigid load supporting means being supported only by said pivot mounting means and by said front portion supporting means;
wherein independent relative movement of said rear ends of said rear spaced frame members is provided relative to said forward frame in a plane transverse to a longitudinal axis of each rear spaced frame member as said truck passes over uneven terrain.

20. The truck of claim 19, further comprising a cross member interconnecting said rear spaced frame members, said cross member having substantial stiffness in a horizonal plane to resist relative lengthwise movement between said rear spaced frame members, to contribute to maintenance of the transverse spacing between said rear spaced frame members, but being relatively complaint to allow relative up and down displacement between the said rear spaced frame members.

21. A truck comprising:

a main frame having a forward frame and a rear frame, said forward frame including a) a spaced frame member means having two forward spaced frame members and b) forward frame means, fixedly positioned transverse between said two forward spaced frame members, for maintaining said forward spaced frame members rigid, said rear frame including a spaced frame member means having two rear spaced frame members having a) front ends which are rigidly affixed to the forward frame means and b) rear ends which provide compliance for independent relative movement of said rear ends in a plane transverse to a longitudinal axis of each rear spaced frame member;

a wheel mounting hub attached to each said rear end of said rear spaced frame members, each hub supporting a pair of rear wheels, one on either side of said hub;

rigid load supporting means for supporting a load and for maintaining transverse spacing between said rear wheel pairs; and means for pivotally mounting said rigid load supporting means with respect to said main frame;

wherein independent relative movement of said rear ends of said rear spaced frame members is provided relative to said forward frame in a plane transverse to a longitudinal axis of each rear spaced frame member as said truck passes over uneven terrain.

22. A truck comprising:

a main frame having a forward frame and a rear frame, said forward frame including a) a spaced frame member means having two forward spaced frame members and b) forward frame means, fixedly positioned transverse between said two forward spaced frame members, for maintaining said forward spaced frame members rigid, said rear frame including a spaced frame member means having two rear spaced frame members having a) front ends which are rigidly affixed to the forward frame means and b) rear ends which provide compliance for independent relative movement of said rear ends in a plane transverse to a longitudinal axis of each rear spaced frame member;

a wheel mounting hub attached to each said rear end of said rear spaced frame members, each hub supporting a pair of rear wheels, one on either side of said hub;

rigid load supporting means for supporting a load;

means for maintaining transverse spacing between said rear wheel pairs; and means for pivotally mounting said rigid load supporting means with respect to said main frame;

wherein independent relative movement of said rear ends of said rear spaced frame members is provided relative to said forward frame in a plane transverse to a longitudinal axis of each rear spaced frame member as said truck passes over uneven terrain.

23. The truck of claim 22, wherein said forward frame means also carries supporting means for supporting a forward end of the rigid load supporting means at a central point or at a pair of transversely spaced points, said supporting means and said means for pivotally mounting said rigid load supporting means constituting sole supports for said rigid load supporting means on said main frame.

24. The truck of claim 23, wherein said supporting means are located at a rearmost side of said forward frame means to induce a bending moment in opposition to bending moments caused by braking of the truck.

25. The truck of claim 8, further comprising two front suspension means connected to said forward frame means and to each front wheel, each said suspension means for providing minimal or zero roll resistance so as to facilitate said rotation of said rear wheel pairs.

26. The truck of claim 25, wherein each said suspension means includes an upper gas filled chamber providing part of a suspension function of each said suspension means, said chambers being interconnected by conduit means to reduce the roll resistance of each said suspension means.

27. A truck comprising:

a main frame having a forward frame and a rear frame, said forward frame including a) a spaced frame member means having two forward spaced frame members and b) forward frame means, fixedly positioned transverse between said two forward spaced frame members, for maintaining said forward spaced frame members rigid, said rear frame including a spaced frame member means having two rear spaced frame members having a) front ends which are rigidly affixed to the forward frame means and b) rear ends which provide compliance for independent relative movement of said rear ends in a plane transverse to a longitudinal axis of each rear spaced frame member;

a hub supporting means for supporting a wheel mounting hub attached to each said rear end of said rear spaced frame members, each wheel mounting hub supporting a pair of rear wheels, one on either side of said wheel mounting hub;

rigid load supporting means for supporting a load and for maintaining transverse spacing between said rear wheel pairs;

pivot mounting means for pivotally mounting said rigid load supporting means with respect to said main frame at or adjacent the hub supporting means wherein said pivot mounting means is positioned over each pair of rear wheels, the rigid load supporting means being sufficiently rigid to maintain a spacing between the two rear spaced frame members;

front portion supporting means operatively positioned on said forward frame means for supporting a front portion of the rigid load supporting means at or adjacent a vertical plane passing through an axis of rotation of front wheels of said truck; and means for elevating the front portion of the rigid load supporting means about said pivot mounting means and being supported by said forward frame means so as to reduce application of bending moments to said main frame, the rigid load supporting means being supported only by said pivot mounting means and by said front portion supporting means;

wherein independent relative movement of said rear ends of said rear spaced frame members is provided relative to said forward frame in a plane transverse to a longitudinal axis of each rear spaced frame member as said truck passes over uneven terrain.

28. A truck comprising:

a main frame having a forward frame and a rear frame, said forward frame including a) a spaced frame member means having two forward spaced frame members and b) forward frame means, fixedly positioned transverse between said two forward spaced frame members, for maintaining said forward spaced frame members rigid, said rear frame including a spaced frame member means having two rear spaced frame members having a) front ends which are rigidly affixed to the forward frame means and b) rear ends which provide compliance for independent relative movement of said rear ends in a plane transverse to a longitudinal axis of each rear spaced frame member;

a hub supporting means for supporting a wheel mounting hub attached to each said rear end of said rear spaced frame members, each wheel mounting hub supporting a pair of rear wheels, one on either side of said wheel mounting hub;

rigid load supporting means for supporting a load;

means for maintaining transverse spacing between said rear wheel pairs;

pivot mounting means for pivotally mounting said rigid load supporting means with respect to said main frame at or adjacent the hub supporting means wherein said pivot mounting means is positioned over each pair of rear wheels, the rigid load supporting means being sufficiently rigid to maintain a spacing between the two rear spaced frame members;

front portion supporting means operatively positioned on said forward frame means for supporting a front portion of the rigid load supporting means at or adjacent a vertical plane passing through an axis of rotation of front wheels of said truck; and means for elevating the front portion of the rigid load supporting means about said pivot mounting means and being supported by said forward frame means so as to reduce application of bending moments to said main frame, the rigid load supporting means being supported only by said pivot mounting means and by said front portion supporting means;

wherein independent relative movement of said rear ends of rear spaced frame members is provided relative to said forward frame in a plane transverse to a longitudinal axis of each rear spaced frame member as said truck passes over uneven terrain.

29. A truck according to claim 8 wherein said forward frame means includes bumper means.

30. A truck according to claim 1 wherein said forward frame means includes bumper means.

* * * * *

UNITED STATES PATENT AND TRADEMARK OFFICE
CERTIFICATE OF CORRECTION

PATENT NO. : 5,385,391
DATED : January 31, 1995
INVENTOR(S) : Alan W. Dickerson

It is certified that error appears in the above-indentified patent and that said Letters Patent is hereby corrected as shown below:

On the title page, item [73], should read:

-- Queensland, Australia --.

Signed and Sealed this

Fifth Day of September, 1995

*Attest:*

BRUCE LEHMAN

*Attesting Officer*     *Commissioner of Patents and Trademarks*